March 4, 1958   M. L. NELSON ET AL   2,825,209
APPARATUS FOR PRODUCING COMPRESSED ICE CHIPS
Filed April 21, 1954   2 Sheets-Sheet 1
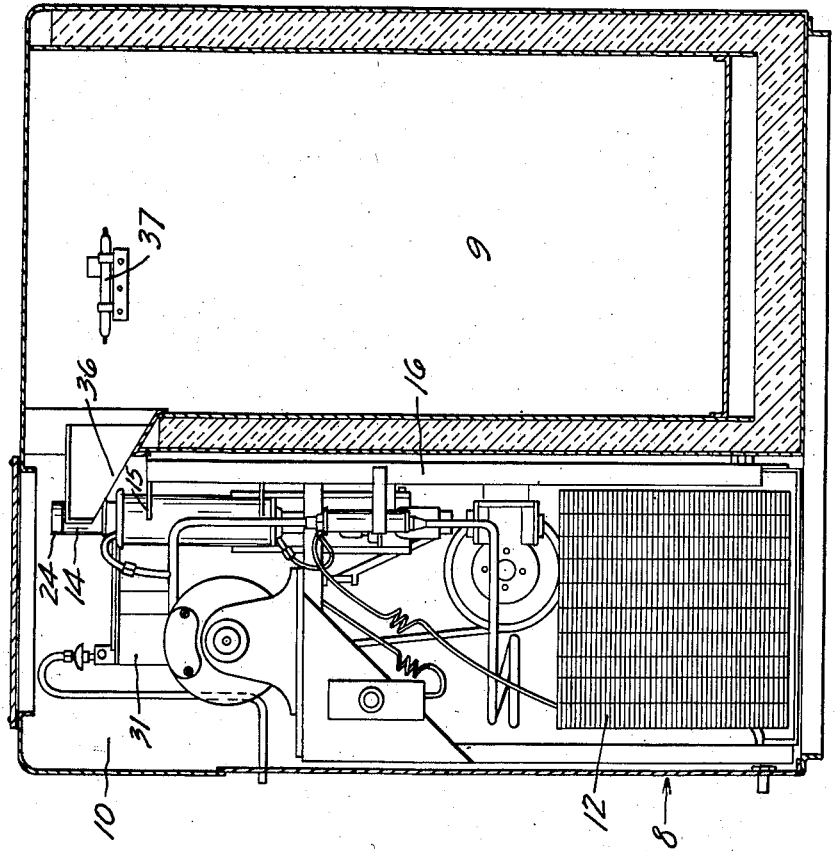
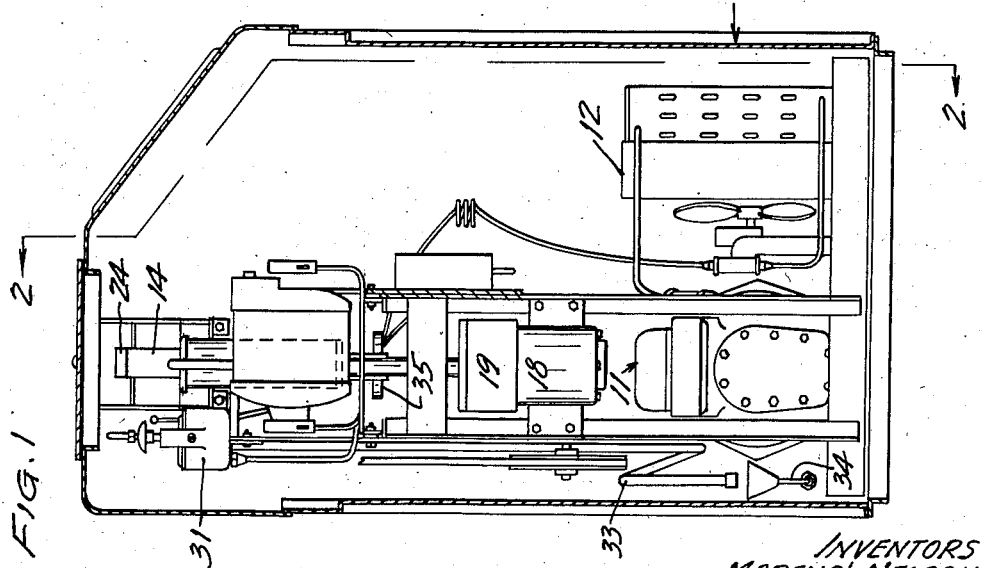
INVENTORS
MARCUS L. NELSON
BENJAMIN K. ROBERTS
BY Williamson, Williamson, Schroeder & Adams
ATTORNEYS

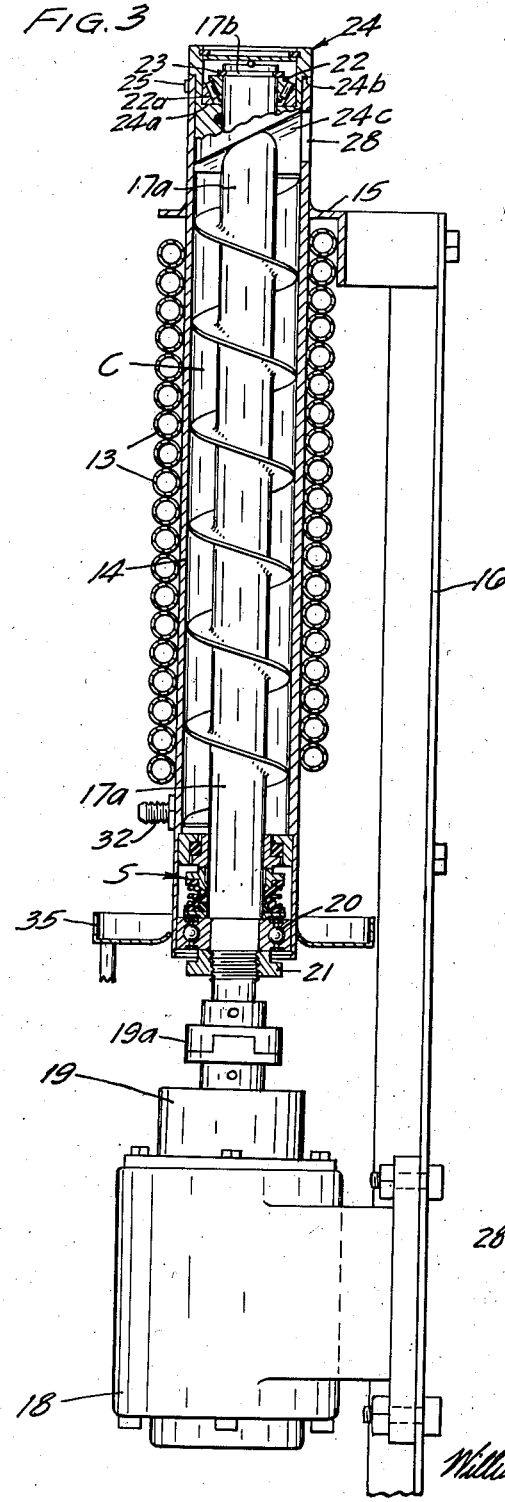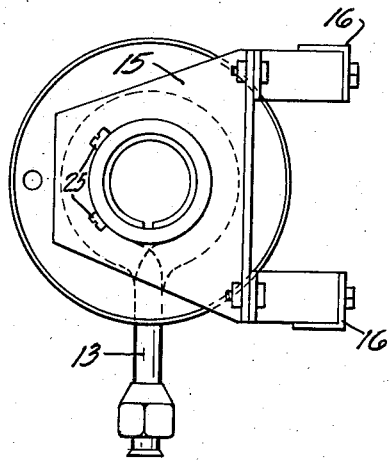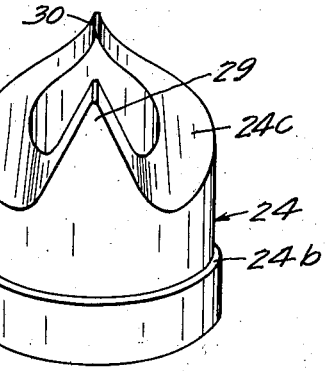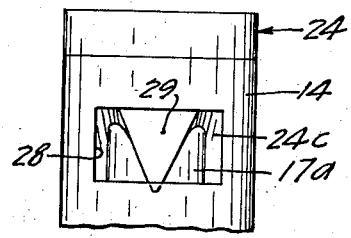
INVENTORS
MARCUS L. NELSON
BENJAMIN K. ROBERTS
BY
ATTORNEYS

United States Patent Office 2,825,209
Patented Mar. 4, 1958

2,825,209
APPARATUS FOR PRODUCING COMPRESSED ICE CHIPS

Marcus L. Nelson, Albert Lea, and Benjamin K. Roberts, Lyle, Minn., assignors to Queen Stove Works, Inc., a corporation of Delaware Application April 21, 1954, Serial No. 424,648

3 Claims. (Cl. 62—105)

This invention is an improvement on the invention disclosed and claimed in the co-pending application entitled Ice Disintegrating and Chip Delivering Spiral Ice Chip Producing Machine, filed September 17, 1952, Serial No. 310,016, and invented by Fay A. Trow and Marcus Nelson, and now Patent No. 2,753,694.

While the above identified invention has operated successfully, a problem has existed in the removal of the ice from the auger shaft. If the auger is run at a sufficiently slow speed to produce solid ice pieces, freeze-ups have occurred which prevent rotation of the auger and at times cause distortion of the auger shaft.

It is an object of the present invention to provide a highly efficient ice flake producing machine which is constructed to freeze only relatively slushy masses of ice and to progressively convey said masses to a restricted compressing and discharging guideway for positively removing the slushy masses from the auger and guiding the same through a restricted discharge opening and thereby remove a substantial portion of the water in said masses before ejection, and discharge relatively clear ice.

It is a further object to provide a novel and highly efficient method for producing substantially clear flake ice chips.

It is another object to provide an ice flake machine having a cylindrical upstanding ice freezing chamber with means for maintaining liquid to be frozen at a predetermined level therein and having a rotatable auger working in closely spaced relation to the inside wall of said cylindrical freezing chamber to remove frozen masses from said wall and carry the same to a restricted compressing and discharging guideway and opening designed to positively remove the ice masses from the auger shaft while compressing the same, the means for rotating said auger driving the same at a speed sufficient to prevent solid ice from forming on the inside walls of the freezing chamber and delivering compressible slushy masses upwardly to said compressing, removing and discharging guideway and opening.

More specifically, it is an object to provide a shaft journalling bushing surrounding the upper end of the ice delivering auger having a gradually beveled ice removing and compressing surface with depending wedge shaped compressing elements for gradually reducing the size of the discharge guideway toward the discharging area thereof.

These and other objects and advantages of this invention will more fully appear from the following description made in connection with the accompanying drawings wherein like reference characters refer to the same or similar parts throughout the several views, and in which:

Fig. 1 is an end elevational view of the flake producing apparatus with one end of the casing removed;

Fig. 2 is a front elevational view thereof with the front portion of the casing removed along the broken line 2—2 of Fig. 1;

Fig. 3 is a side elevational view of our new ice producing mechanism and showing the freezing assembly in central vertical section.

Fig. 4 is a top plan view thereof;

Fig. 5 is a perspective view of our new ice removing and compression member; and Fig. 6 is a fragmentary view showing the ice delivery opening from the freezing chamber in elevation.

As illustrated in the accompanying drawings, we provide a casing designated as an entirety by the numeral 8 which, as shown in Fig. 2, is divided into a storage compartment 9 and an ice making apparatus housing portion 10. The ice producing apparatus enclosed within the housing portion 10 consists in a refrigeration system having a motor driven compressor 11, a condenser 12 and an expansion coil 13. The expansion coil 13 surrounds the greater portion of an elongated hollow cylindrical member 14 between the end portions thereof and defines a freezing chamber C within the surrounded area which, in the form shown, is disposed in upstanding relation. A suitable bracket 15 is fixed to the upper portion of the cylindrical member 14 and a suitable supporting frame 16 is provided, and the bracket 15 is rigidly attached to the upper portion thereof as best shown in Figs. 3 and 4.

An auger 17 is axially journalled within the cylindrical freezing chamber C and extends from one end thereof to the other. The diameter of the auger is slightly smaller than the inside diameter of the chamber to provide a very slight space between the outer peripheral edge of the auger and the inside wall of said chamber in order to remove the ice layers from the inside wall surface of said chamber but preventing contact between the auger edge and the chamber wall.

The auger 17 is driven by any suitable means such as the electric motor 18 which is connected to the shaft 17a of said auger through a reduction gear housed in gear box 19 and through a self-aligning drive connection such as the Boston coupling 19a. The motor 18 is rigidly mounted on the lower portion of frame structure 16, as best shown in Fig. 3, and the gear box 19 is fixed to said motor.

The alignment of the auger within the freezing chamber is highly critical and must be accurately maintained in order to prevent contact between the outer peripheral edge of the auger and the inside wall of the cylinder. The lower portion of the auger shaft 17a is reduced slightly, and a bearing 20 is interposed between the reduced portion and the adjacent portion of the hollow cylindrical member 14 to axially position the lower portion of the auger within said cylinder 14. In the form shown, the reduced portion of shaft 17a is threaded and receives an internally threaded bearing retaining nut 21 thereon to securely hold the bearing 20 against axial shifting movement. This retaining nut 21 and bearing 20 also serve to maintain a suitable water-tight seal of any conventional design between the lower portion of shaft 17a and the adjacent inside wall of cylinder 14.

The upper end of auger shaft 17a is journalled within the upper end of cylinder 14 by a thrust bearing 22 which is retained on said shaft by a split collar 23 removably inserted into a groove 17b formed in the upper portion of said shaft. A hollow ice removing and discharging bushing member 24 is mounted in the upper portion of freezing cylinder 14 and the lower portion thereof has an inside diameter to closely surround the upper portion of auger shaft 17a and an outside diameter to closely fit within the upper portion of said cylinder 14. A bearing receiving recess is provided in the upper inside portion of said bushing member and forms an abutment shoulder 24a which receives in firm engagement therewith a tapered insert member 22a which forms the lower race for thrust bearing 22. An outer abutment shoulder 24b is formed around the upper marginal portion of bushing 24 for positive engagement with the upper end of freezing cylinder 14, as best shown in Fig. 3. Suitable means for positively anchoring the bushing within the upper portion of said cylinder 14 are provided, such as the cap screws 25 which extend through apertures in the upper portion of cylinder 14 and are received in a cooperating threaded aperture provided in said bushing which are, of course, brought into registration with the apertures in said cylinder.

A restricted discharge opening 28 is formed through the side wall of the upper portion of cylinder 14, and the lower end of the bushing 24 is beveled upwardly toward said opening to provide a positive ice removing and compressing guideway 24c on each side of said auger shaft for delivering the ice outwardly through the opening 28. A pair of depending, upwardly diverging wedge-shaped guiding elements 29 and 30 are respectively formed at the front and rear of said beveled guideways 24c and serve to divert the front and rear portions of said guideways. In the form shown, the front wedge 29 is positioned centrally of the opening 28 and divides the same into two separate discharge openings diminishing in size from the bottom to the top thereof to restrict the flow of ice chips therethrough and gradually compress the chips as the same are delivered outwardly from the auger along said guideway 24c and upwardly along the diverging surfaces of front wedge 29.

The water level within the cylindrical member 14 is maintained substantially constant by the float controlled reservoir tank 31 and a suitable tubular conduit connects said tank 31 with the lower end of chamber C as by the threaded connector element 32, best shown in Fig. 3. In the event that the float valve within tank 31 becomes inoperative, an overflow level limiting drain conduit 33 is mounted therein and discharges to a suitable drain outlet 34. A drip tray 35 is mounted along the lower portion of cylinder 14 and collects the condensation from the outside of freezing coil 13 and carries the same to a suitable drain.

The incline of the beveled guideway surfaces 24c must be sufficient to maintain a steady flow of ice thereacross toward the discharge openings on each side of the upwardly diverging wedge 29. If this bevel is too flat (too nearly normal to the axis of auger shaft 17a), the ice constantly moving upwardly from the auger 17 will jam at the discharge opening and cause possible damage to the parts of the apparatus. Therefore, the bevel of the guideway surfaces 24c must be sufficiently inclined to prevent jamming of the ice thereagainst and produce constant lateral delivery of said ice outwardly toward said opening 28. In addition to the compression of the slushy masses against the guideway surfaces 24c, the discharge area of the opening 28 is designed to restrict the flow of said masses and further compress the same before discharge therethrough. In other words, the discharge of said masses through the open area of said opening 28 simulates an extrusion process. In the form shown, as has been previously stated, the front wedge 29 divides the open area into a pair of separate discharge openings receiving respectively from the beveled guideway 24c. These openings progressively increase in area from the top to the bottom thereof so that, as the volume of ice being discharged therethrough builds up from the top down on said guideway surfaces 24c, the area of discharge through the opening will rapidly increase to prevent jamming of the ice chips but still producing the desired compression thereof and untimately delivering substantially clear ice chips from which substantially all of the moisture has been removed through compression. The materially reduced area of discharge toward the top of the openings provides substantial compression of the ice chips even when relatively low volumes of ice are being delivered from said auger.

It will be seen that we have provided a relatively simple, yet highly efficient, ice chip producing machine which is designated to initially produce slushy masses and then subsequently compress said slushy masses to remove substantially all of the moisture therefrom and ultimately deliver substantially clear ice chips to the storage bin from which substantially all of the moisture has been removed.

In addition to the apparatus previously described, it will also be seen that we have provided a novel and highly efficient method of producing ace chips consisting in the formation of relatively soft, slushy masses in an ice freezing chamber continuously delivering said slushy masses from said chamber, compressing said masses to remove the moisture therefrom, and finally discharging said compressed masses into a storage location.

It will, of course, be understood that various changes may be made in the form, details, arrangements and proportions of the parts of our apparatus without departing from the scope of this invention which, generally stated, consists in the matter shown and described herein and set forth in the appended claims.

What we claim is:

1. An ice chip producing machine comprising an elongated hollow cylindrical member defining a cylindrical freezing chamber therewithin and having one end thereof disposed at a higher elevation than the other with means for sealingly closing the lower end, water supply means for delivering a supply of water to the inside of the freezing chamber, refrigeration means for cooling said freezing chamber to freeze portions of the water supplied thereto on the inside wall of said chamber, an ice conveying auger axially journalled for rotation within said chamber and extending upwardly therethrough with the outer edge thereof in slightly spaced relation to the inside wall of said cylindrical member, means for driving said auger at a rate sufficient to prevent the formation of hard solid ice bodies on said chamber wall, said auger having an upwardly extending shaft portion fixed to the upper end thereof, said cylindrical member having a discharge opening formed on the upper portion thereof, a bushing surrounding said shaft and closely fitting with the upper portion of said cylindrical member adjacent the opening therethrough, said bushing having ice engaging and compressing surfaces inclined outwardly toward said discharge opening, the angle of inclination of the ice engaging and compressing surfaces and the size of the opening compressing the slushy ice masses as the same are delivered upwardly from said auger.

2. An ice chip producing machine comprising an elongated hollow cylindrical member defining a cylindrical freezing chamber therewithin and having one end thereof disposed at a higher elevation than the other with means for sealingly closing the lower end, water supply means delivering a supply of water to said freezing chamber, refrigeration means for cooling said freezing chamber to freeze portions of the water supplied thereto on the inside wall of the chamber, an ice conveying auger axially journalled for rotation within the chamber and extending upwardly therethrough with outer edge thereof disposed in slightly inwardly spaced relation to the inside surface of said freezing chamber, means for driving the auger at a speed sufficient to permit the formation of only slushy ice masses on said chamber wall, said auger carrying said masses upwardly within said chamber, said auger having an upwardly extending shaft portion fixed to the upper end thereof, said cylindrical member having a discharge opening formed in the upper side wall portion thereof above the upper end of said auger, said opening being sufficiently small with respect to the ice delivered thereto by said auger to compress said ice as the same is discharged therethrough; and means for guiding said ice from said auger to said opening.

3. The structure set forth in claim 2, and said bushing having a downwardly convergent, generally wedge-shaped dividing member and said guiding means consisting in an inclined guiding surface disposed above said auger to receive the ice delivered therefrom and terminating in a downwardly convergent wedge-shaped dividing element extending into said opening to gradually reduce the area of discharge toward the top thereof whereby the slushy masses delivered to said opening from said inclined surface are compressed during their restricted discharge through said opening and whereby the area of discharge of said opening will be materially increased as the volume of ice discharged therethrough increases.

References Cited in the file of this patent

UNITED STATES PATENTS

| | | |
|---|---|---|
| 530,526 | Holden | Dec. 11, 1894 |
| 1,020,759 | Holden | Mar. 19, 1912 |
| 1,104,920 | Osborne | July 28, 1914 |
| 1,999,712 | Zorn | Apr. 30, 1935 |
| 2,071,465 | Huber | Feb. 23, 1937 |
| 2,259,841 | Spiegl | Oct. 21, 1941 |
| 2,522,651 | Van Vleck | Sept. 19, 1950 |
| 2,556,510 | Topping | June 12, 1951 |
| 2,595,588 | Lee | May 6, 1952 |
| 2,597,515 | Nitsch | May 20, 1952 |
| 2,639,594 | Watt | May 26, 1953 |

FOREIGN PATENTS

| | | |
|---|---|---|
| 901,420 | Germany | Jan. 11, 1954 |